March 18, 1930. G. M. THOMSON 1,751,430
PROCESS AND APPARATUS FOR MAKING CELLULAR INSULATING MATERIAL
Filed July 25, 1928
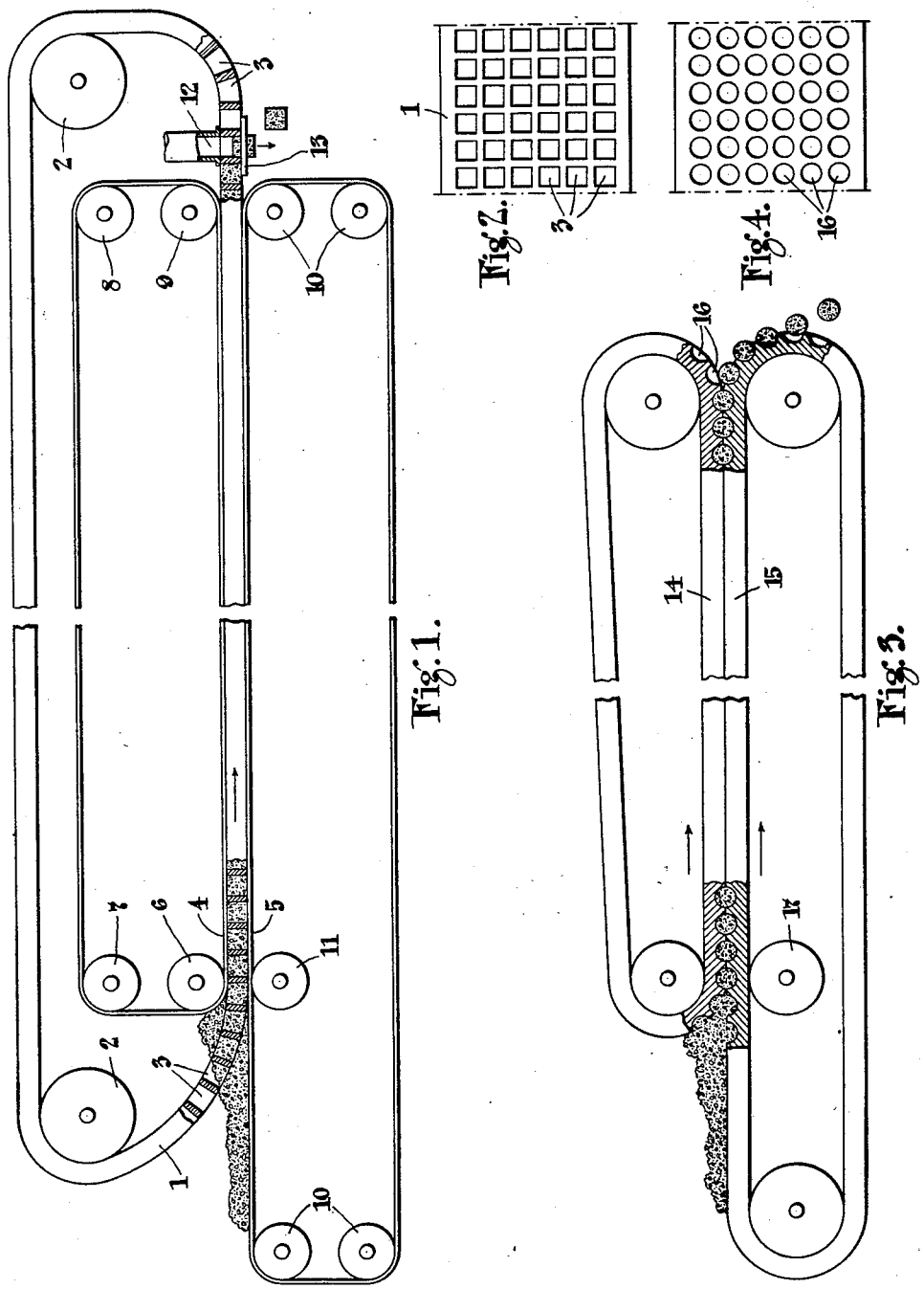
G. M. Thomson
INVENTOR Patented Mar. 18, 1930

1,751,430

UNITED STATES PATENT OFFICE

GEORGE MILLER THOMSON, OF CALEDONIA, ONTARIO, CANADA, ASSIGNOR TO CANADA GYPSUM AND ALABASTINE, LIMITED, OF PARIS, ONTARIO, CANADA

PROCESS AND APPARATUS FOR MAKING CELLULAR INSULATING MATERIAL

Application filed July 25, 1928. Serial No. 295,295.

This invention relates to the making of cellular insulating material from quick-setting cementitious materials and particularly to a process and apparatus whereby an aerated slurry of gypsum or like material may be formed into cellular bodies which constitute a mobile mass adapted to be placed in the walls or other portions of buildings.

In a previous application, Serial No. 224,520, filed October 6, 1927, this material was described and claimed.

The object of the present invention is to provide a process and apparatus for the production of such material from a slurry of gypsum with which is uniformly incorporated bubbles which give the cellular character to the finished product. The bubbles are formed in or mixed with the slurry in any desired way. It is important, however, that the bubbles be of substantially uniform size and uniformly distributed throughout the slurry.

A further object of the invention is to so form or mould pellets of the material that the cells therein will be of uniform size, so that the product will have greatest strength and insulating value.

Referring now to the accompanying drawings, which illustrate, by way of example, two convenient embodiments of the invention:

Figure 1 is a diagrammatic side elevation, partially in section, of one form of the invention;

Figure 2 is a plan view of a portion of the perforated belt shown in Figure 1;

Figure 3 is a diagrammatic side elevation of another form of apparatus, and

Figure 4 is a plan view of a portion of the belt shown in Figure 3.

The apparatus in Figure 1 is the preferred form and comprises an endless perforated belt 1, which passes over rolls 2. The perforations 3 of the belt may be of square cross-section as shown, or of any other suitable section. The lower stretch of the belt 1 is in contact for a considerable part of its length with belts 4 and 5, which are preferably of waxed or oiled fabric. The belt 4 passes over rolls 6, 7, 8 and 9, while the belt 5 passes over rolls 10. A roll 11 is provided to hold the belts 1, 4 and 5 firmly in contact against the roll 6 which may be driven to cause the belts to travel in the direction indicated by the arrow.

A slurry of cellular gypsum or similar material is fed on to the left-hand end of the belt 5 and is carried towards the underside of the belt 1 where it is squeezed into the perforations 3. The excess material is held back by the pressure exerted by rolls 6 and 11. It will be seen that the material is forced through the perforations before they are closed by the belts 4 and 5, and the trapping of air in the perforations is thus avoided. The material is held in the perforations by the belts 4 and 5. The distance between the roll 6 to the roll 9 is such, and the speed of travel is so selected, that the material will have set and become substantially hard by the time it reaches the neighbourhood of roll 9. Beyond the roll 9 is arranged an ejecting device, such as an air pressure nozzle 12. The belt 1 at this point may be supported by a grid 13 through which the hardened cubes of material are ejected as indicated in Figure 1.

The cubes may be discharged on to a conveyor which carries them to a drier, and after drying they are preferably treated in a rotating drum, or preferably a screen cylinder, to remove their sharp corners and edges so that their final shape is substantially spheroidal. They may then be subjected to a water-proofing treatment.

The portions broken off the cubes in the cylinder are discharged through the screen, or otherwise, as cellular flakes before they can be pulverized and lose their cellular nature.

The apparatus shown in Figure 3 comprises two belts 14 and 15, the outer surfaces of which are formed with hemi-spherical cavities 16. The belts are so maintained in relation to each other that the rows of cavities 16 on one belt are adapted to move successively into register with rows of cavities in the other belt. The material is fed on to the projecting end of the belt 15 and is carried towards the belt 14. A roll 17 holds the belts 14 and 15 firmly in contact with each other and causes the approaching complementary cavities in the belts to become filled with material. The spheres of material thus formed are carried to the other end of the apparatus, and during this movement they are hardened. Upon reaching the other end of the apparatus the spheres fall from the cavities and may be carried away for drying and waterproofing treatment, as already described. Any suitable means may be provided for ejecting the spheres if their weight is not sufficient to detach them from the belts.

It will be evident that various modifications may be resorted to without departing from the invention.

It is to be noted, however, that it is essential to avoid the inclusion in the molded pellets of volumes of air not specifically mixed with the slurry prior to its admission to the belt. The inclusion of such air would destroy the uniformity of the cellular nature of the product and thus impair its important characteristics.

In the form of apparatus shown in Figure 3, or more particularly in various modifications thereof which have been considered and which will readily suggest themselves to those skilled in the art, it may be necessary to employ flexible membranes of rubber or like material to loosely cover the belts in such a manner that the membrane will be carried into the cavities with the slurry forcing the air out of the cavities through openings in the back wall thereof. This has not been found necessary with the form of apparatus shown and it is mentioned only for fullness of disclosure with respect to modifications, which are thought to be obvious. Moreover, it may be found necessary to provide means in the form shown in Figure 3 to ensure maintenance of registry of the voids in the two supports. Such means might take the form of a series of projections or teeth arranged along the side edges of one belt and engaging teeth or depressions in the edges of the other belt.

The belts 4, 5, 14 and 15 are made of rubber or other suitable flexible, but sufficiently rigid, material.

It is desirable to keep the pellets or cubes from exposure to currents of air, since surfaces so exposed become more tenacious, thus offering more resistance to the escape of moisture from the interior of the cube or pellet. In drying, the solution moves outwardly to the surface where evaporation of any excess moisture takes place, leaving the hydrated material to set within and about the crystals at this point. Uniformity of drying at the surfaces is thus desirable.

While the present invention is not limited as to any particular size of the spheroidal bodies, a size of $\frac{1}{4}$ or $\frac{5}{16}$ inch in diameter gives good results. The cubes formed in the apparatus of Figure 1 should thus be about $\frac{3}{8}$ inch to a side.

What I claim is:

1. In a process of producing a mobile mass of cellular gypsum from an aerated slurry of gypsum, the steps which consist in forming the slurry into substantially cubical bodies and treating said bodies to give them a rounded contour.

2. Apparatus for the production of a mobile mass of cellular insulating material comprising an endless perforated band, a belt in contact with said band and closing the upper ends of the perforations in a portion of said band, and a fabric belt closing the lower ends of the perforations in said portion of the band.

3. Apparatus as claimed in claim 2, wherein said belts are of waterproofed fabric.

4. Apparatus as claimed in claim 2, wherein said lower belt projects beyond one end of said band to receive material to be conveyed to said band.

5. Apparatus as claimed in claim 2, wherein the band extends beyond the belts at one end, and wherein means are provided for ejecting bodies of material from said perforations.

In testimony whereof I have affixed my signature.

GEORGE MILLER THOMSON.